United States Patent
Keys et al.

(10) Patent No.: US 8,713,557 B2
(45) Date of Patent: *Apr. 29, 2014

(54) PEER-TO-PEER METHOD OF DEPLOYING AND MANAGING EXECUTABLE CODE AND ASSOCIATED PLUG-INS

(75) Inventors: Gregory C. Keys, Warwick, NY (US); Hiroshi Kitada, Tuckahoe, NY (US)

(73) Assignees: Ricoh Company, Ltd., Tokyo (JP); Ricoh Americas Corporation, West Caldwell, NJ (US)

( * ) Notice: Subject to any disclaimer, the term of this patent is extended or adjusted under 35 U.S.C. 154(b) by 716 days.

This patent is subject to a terminal disclaimer.

(21) Appl. No.: 12/491,738

(22) Filed: Jun. 25, 2009

(65) Prior Publication Data

US 2010/0333080 A1 Dec. 30, 2010

(51) Int. Cl.
*G06F 9/44* (2006.01)

(52) U.S. Cl.
USPC .......................................... 717/171; 717/177

(58) Field of Classification Search
None
See application file for complete search history.

(56) References Cited

U.S. PATENT DOCUMENTS

| | | | | |
|---|---|---|---|---|
| 6,275,987 B1 * | 8/2001 | Fraley et al. | ............... | 717/127 |
| 6,820,259 B1 * | 11/2004 | Kawamata et al. | ............... | 717/173 |
| 6,993,758 B1 * | 1/2006 | Fujita et al. | ............... | 717/168 |
| 7,003,767 B2 * | 2/2006 | Larkin | ............... | 717/172 |
| 2003/0182409 A1 * | 9/2003 | Seaman | ............... | 709/223 |
| 2003/0195974 A1 * | 10/2003 | Ronning et al. | ............... | 709/230 |
| 2005/0086654 A1 * | 4/2005 | Sumi et al. | ............... | 717/171 |
| 2007/0220505 A1 * | 9/2007 | Bukovec et al. | ............... | 717/168 |
| 2008/0209414 A1 * | 8/2008 | Stein | ............... | 717/173 |

OTHER PUBLICATIONS

U.S. Appl. No. 12/491,721, filed Jun. 25, 2009, Keys.
U.S. Appl. No. 12/491,694, filed Jun. 25, 2009, Keys.
U.S. Appl. No. 12/491,711, filed Jun. 25, 2009, Keys.

* cited by examiner

*Primary Examiner* — Elias Mamo
(74) *Attorney, Agent, or Firm* — Oblon, Spivak, McClelland, Maier & Neustadt, L.L.P.

(57) ABSTRACT

A system for peer-to peer distributed client updates. The system includes a server to which a list of target network accessible devices as devices that are to receive an update file is uploaded. The server then generates a list of the targeted network accessible devices, which includes a plurality of superior nodes and a plurality of subordinate nodes, which are each subordinate to a respective one of the superior nodes. The server then sends an update file to each of said superior nodes, which sends the update file to each of the nodes subordinate to the respective superior nodes. Each of the target network accessible devices then directly transmits a reporting result indicating a result of a software update at each of the superior and subordinate nodes.

19 Claims, 14 Drawing Sheets

PEER-TO-PEER METHOD OF DEPLOYING AND MANAGING EXECUTABLE CODE AND ASSOCIATED PLUG-INS

BACKGROUND OF THE INVENTION

1. Field of the Invention

This disclosure relates to a system for updating a fleet of multi-function peripheral (MFPs) in a peer-to-peer manner utilizing software for distributing updates. The software may be used as starting point for update distribution. The method of the present invention involves sending only necessary update files to MFPs (instead of entire binaries) after a peer-to-peer distribution agent is installed in each MFP. The net result is a significant simplification of workflow and results management, and a significant improvement in the speed at which a fleet of MFPs is updated.

2. Description of the Related Art

Updates to a fleet of MFPs can become very repetitive, time-consuming and open to errors in tracking results. For example, consider the example of reconfiguring 900 MFP's which is depicted in FIG. 1.

In this example, a user uploads a file list of target MFPs 102, typically separated into lists 104 of a plurality of MFPs (e.g., 15 in this example), and the upgrade configuration file or certificate. The user then reinstalls the application (packaged with the update file) to the batch of MFPs from the server 100. The user then typically waits approximately 3 minutes to determine the batch results. Any machines that were turned off or did not reboot would report as failed. For failures, the user would have to manually manage a list of these failures and retry the job at this point or later. This process would be repeated 60 times in order to reconfigure all 900 MFP's in the example.

If the user wishes to trace the history of the update job run against all target MFPs (e.g. to determine if any were missed or were still failed), the user must review a log of jobs with over 900 lines of entries, each representing an individual IP address or host name for a given date. Such a process is time consuming, repetitive and prone to human error due to the large number of iterations needed to complete the task.

SUMMARY OF THE INVENTION

Embodiments of the present invention solve the above and other related problems by providing a list-based peer-to-peer distribution. The present invention proposes a system in which updates to a fleet of MFPs are performed in a peer-to-peer manner with a remote installer as starting point. The process also involves sending only necessary update files to MFPs (instead of entire binaries). Additionally, reboots may be removed from the update process. The net result is a significant simplification of workflow and results management, and a significant improvement in the speed at which a fleet of MFPs is updated.

DETAILED DESCRIPTION OF THE INVENTION

Exemplary embodiments of the present invention are described below in detail with reference to the accompanying drawings. For the purpose of this disclosure some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention.

Figure 1:
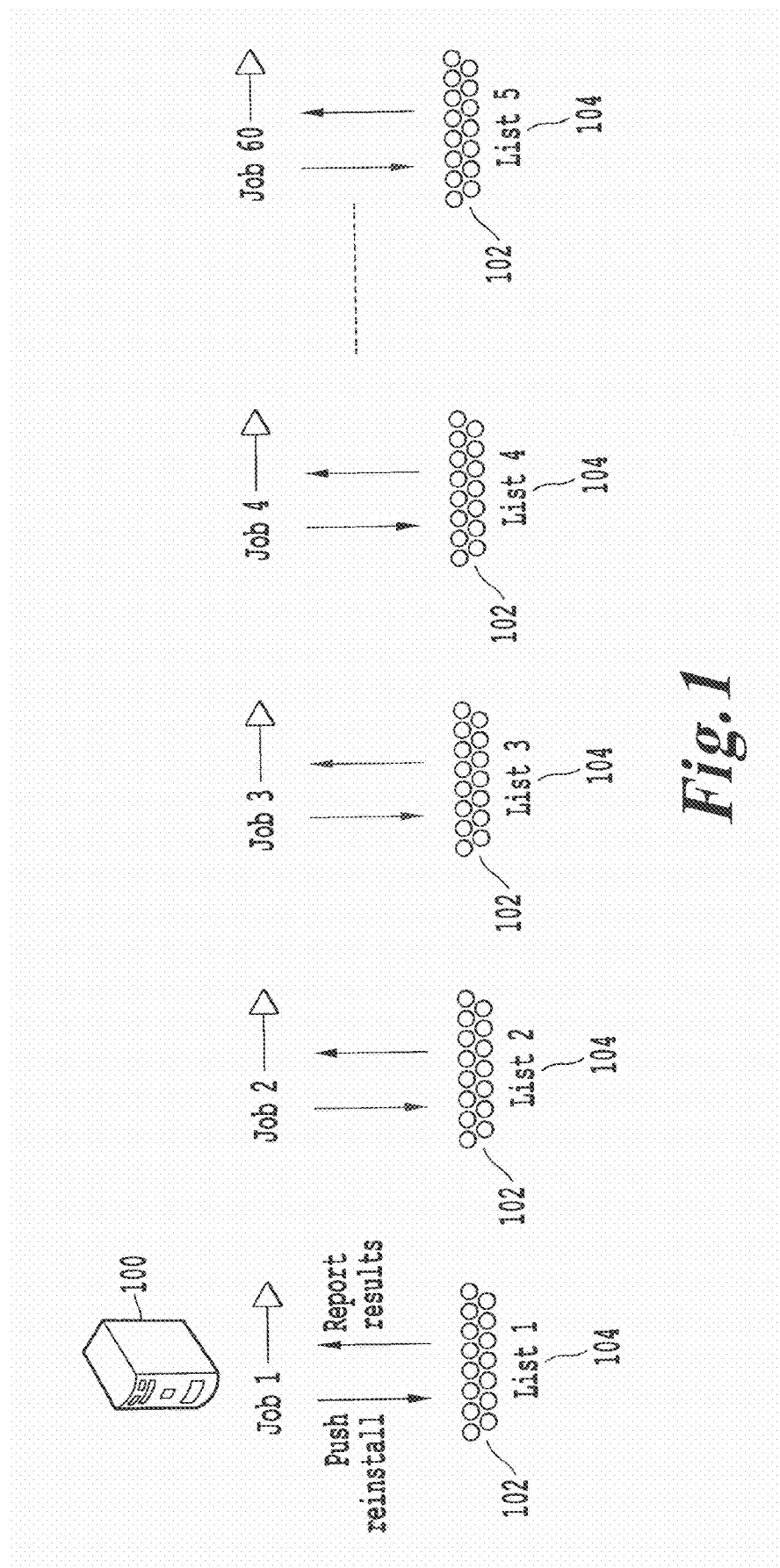
FIG. 1 illustrates a flowchart depicting a background update process.
Figure 2:
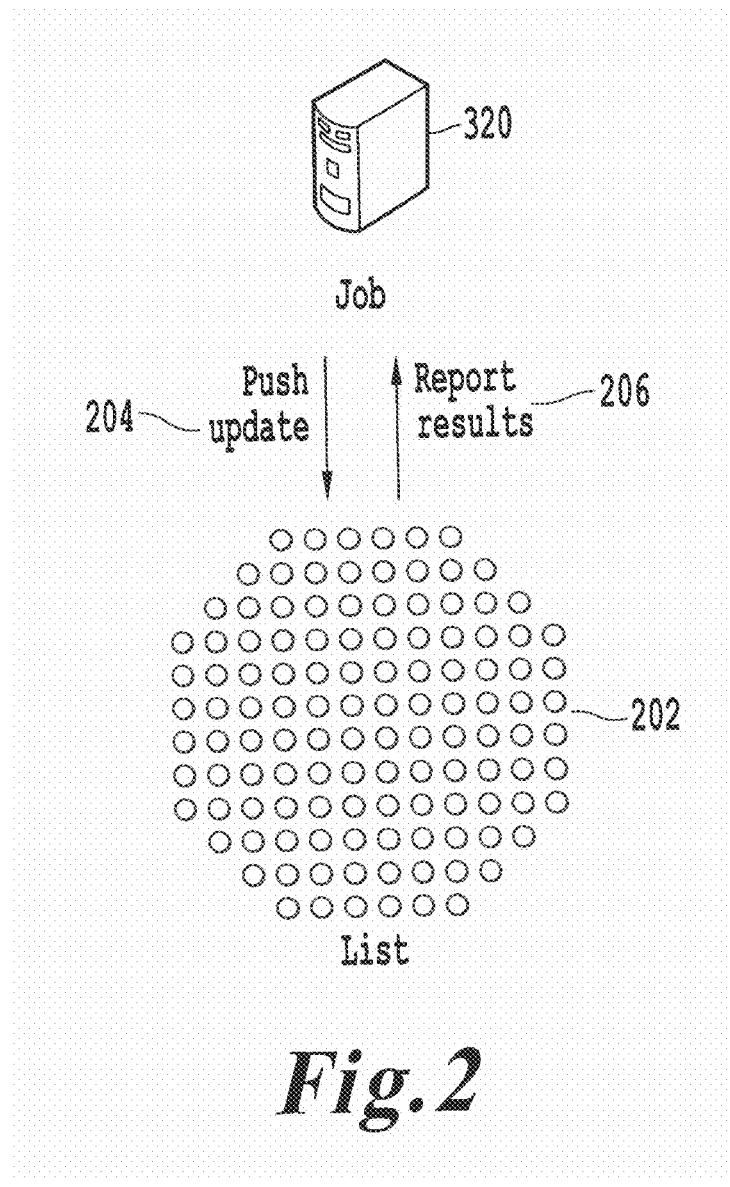
FIG. 2 is a flow chart illustrating an update process peer distribution model according to an exemplary embodiment of the present invention.

In contrast to the process sequence shown in FIG. 1, the user experiences a workflow as represented in FIG. 2. Overall, the user manages only one list of MFPs 202. The entire workflow involves one push 204. Failures require no special management, as retries occur automatically within the peer group. The final result for each MFP (update status as success or fail) persists on the remote installer, and it can be queried as one update job record or one MFP by the user. More particularly, the remote installer delegates the update job to T number of MFPs, and each of these T MFPs in turn delegates the update to T MFPs and so on. When update jobs complete, reports 206 of results will propagate in the opposite direction.

Figure 3:
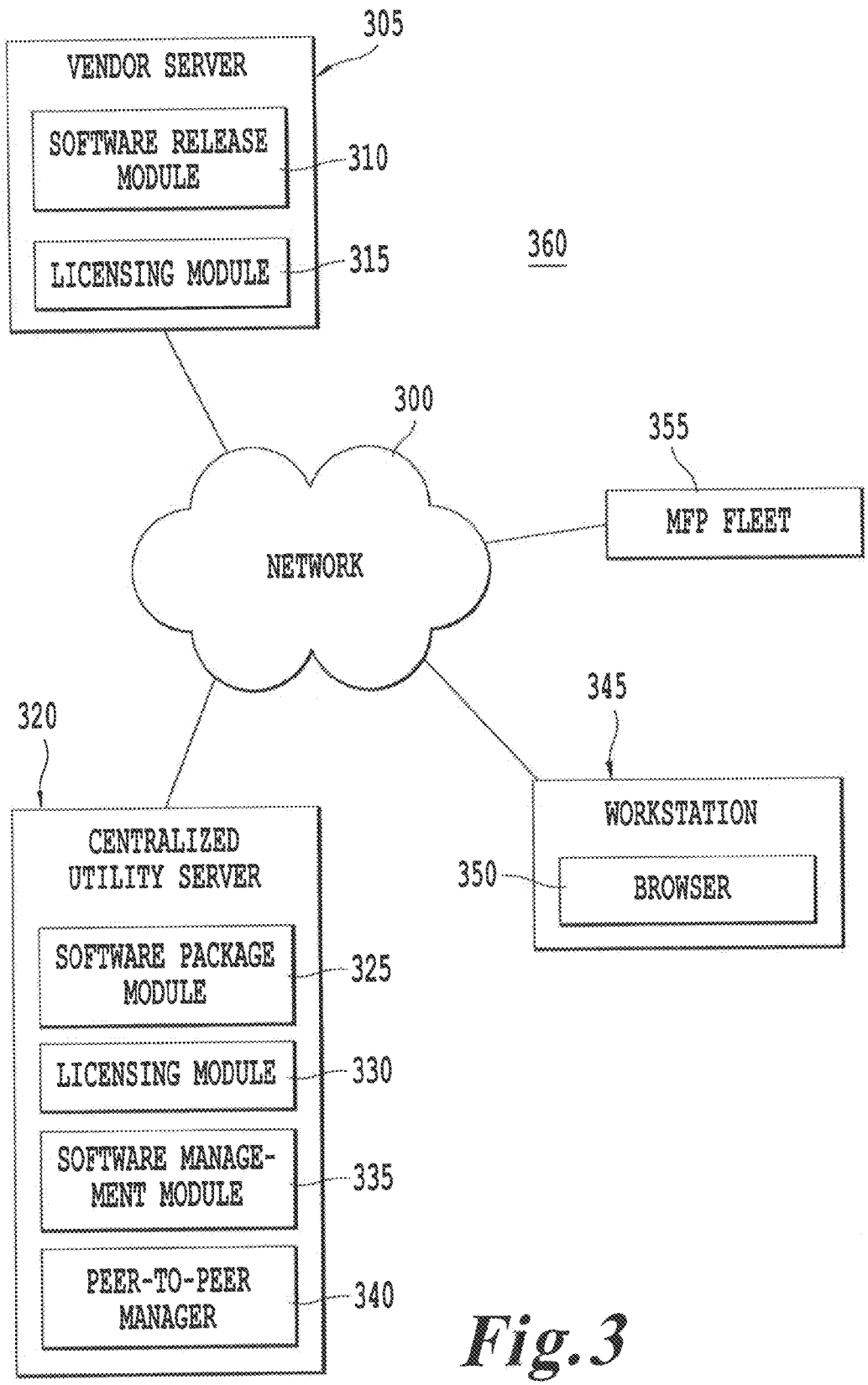
FIG. 3 illustrates an exemplary enterprise-printing environment.

FIG. 3 illustrates an exemplary enterprise printing environment 360 in which the present invention may be implemented. The enterprise printing environment 360 includes a vendor server 305, a centralized utility server 320, a network 300, a fleet of MFPs 355, and an optional a user workstation 345. The network 300 may be a Local Area Network (LAN), Wide Area Network (WAN), or Wireless Local Area Network (WLAN). It is noted that the vendor server 305, centralized utility server 320, workstation 345 and MFP fleet 355 need not be connected to each other over the same network. For example, the centralized utility server 320 may be connected to the vendor server 305 over a first communication path (e.g., the Internet, a LAN, or mobile network), and the centralized utility server 320 may be connected to fleet of MFPs 355 over a second communication path that is different from the first communication path.

The centralized utility server 320 includes a software management module 335 that allows a user accessing the centralized utility server to arrange for the peer-to-peer distribution of the software updates. The user may arrange for the software updates either by accessing the centralized utility server 320, or may remotely access the centralized utility server 320 using a conventional workstation or personal computer 345 using a browser 350. The centralized utility server 320 also includes a licensing module 330, which communicates with a licensing module 315 and software release module 310 of the vendor server 305 to obtain the latest version of software updates from the vendor server 305. A software package module 325 is also provided at the centralized utility server 320. This software package module 325 receives a software update from a software release module, and generates a payload including the software and other instructions, which will be discussed below, for subsequent distribution to the fleet of MFPs 355 over the network 300. A peer-to-peer manager 340 is also provided in the centralized utility server. The peer-to-peer manager 340 pushes the payloads prepared by the software package module 325 to the fleet of MFPs 355 in accordance with the instructions received at the software management module 335. The peer-to-peer manager 340 is also configured to perform additional tasks when the centralized utility server 320 is implemented as the root, as discussed below with reference to FIG. 15.

Figure 4:
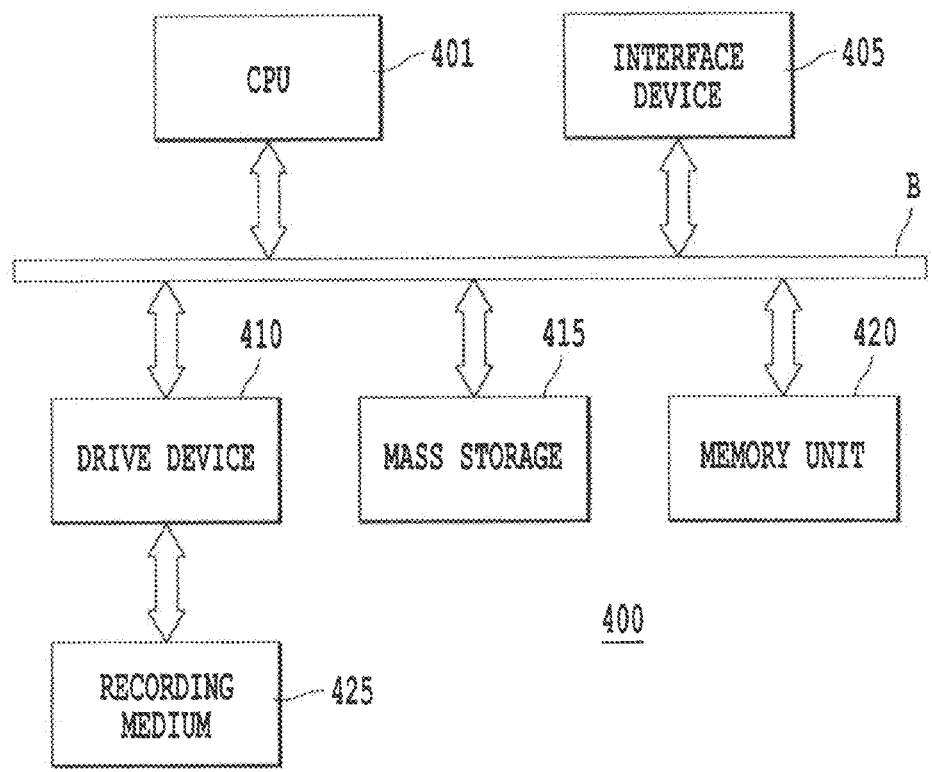
FIG. 4 illustrates hardware components of one embodiment of the vendor server, centralized utility server and workstation.

FIG. 4 illustrates a computer system 400 upon which embodiments of the vendor server 305, centralized utility server 320 and workstation 345 may be implemented. The functions of the vendor server 305, centralized utility server 320 and workstation 345 may be implemented in, for example, workstations, personal computers, laptop computers, personal digital assistants (PDAs), cellular telephone devices, or other mobile devices. The computer system 400 includes a bus B or other communication mechanism for communicating information such as address information and data, and a processor/CPU 401 coupled with the bus B for processing the information. The computer system 400 also includes a main memory/memory unit 420, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 401. In addition, the memory unit 420 may be used for storing temporary variables or other intermediate information during the execution of instructions by the CPU 401. The computer system 400 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 401.

The computer system 400 may also include a disk controller coupled to the bus B to control one or more storage devices for storing information and instructions, such as mass storage 415 which may be a hard disk drive, for example, and drive device 410 (e.g., floppy disk drive, read-only compact disc drive, read/write compact disc drive, compact disc jukebox, tape drive, flash memory or a flash memory based drive, and removable magneto-optical drive). The storage devices may be added to the computer system 400 using an appropriate device interface (e.g., small computer system interface (SCSI), integrated device electronics (IDE), enhanced-IDE (E-IDE), direct memory access (DMA), or ultra-DMA).

The computer system 400 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)) in order to carry out the desired functionality.

The computer system 400 may also include a display controller coupled to the bus B to control a display, such as a cathode ray tube (CRT), organic light emitting diode (OLED) display, or liquid crystal display (LCD), for displaying information to a computer user. The computer system may include input devices, such as a keyboard, pointing device, or touch display, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system 400 performs a portion or all of the processing steps in response to the CPU 401 executing one or more sequences of one or more instructions contained in a memory, such as the memory unit 420. Such instructions may be read into the memory unit from another computer-readable medium, such as the mass storage 415 or a removable media 425. One or more processors in a multi-processing arrangement may also be employed to execute the sequences of instructions contained in memory unit 420. In alternative embodiments, hard-wired circuitry may be used in place of or in combination with software instructions. Thus, embodiments are not limited to any specific combination of hardware circuitry and software.

As stated above, the computer system 400 includes at least one computer-readable medium 425 or memory for holding instructions programmed according to the teachings described herein and for containing data structures, tables, records, or other data described herein. Examples of computer-readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other storage medium from which a computer can read.

Stored on any one or on a combination of computer-readable media is software for controlling the computer system 400, for driving a device or devices, and for enabling the computer system 400 to interact with a human user. Such software may include, but is not limited to, device drivers, operating systems, development tools, and applications software. Such computer-readable media further includes the computer program product for performing all or a portion (if processing is distributed) of the processing described herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The term "computer-readable medium" as used herein refers to any medium that participates in providing instructions to the CPU 401 for execution. A computer-readable medium may take many forms, including but not limited to, non-volatile media, and volatile media. Non-volatile media includes, for example, optical, magnetic disks, and magneto-optical disks, such as the mass storage 415 or the removable media 425. Volatile media includes dynamic memory, such as the memory unit 420.

Various forms of computer-readable media may be involved in carrying out one or more sequences of one or more instructions to the CPU 401 for execution. For example, the instructions may initially be carried on a magnetic disk of a remote computer. The remote computer can load the instructions remotely into a dynamic memory and send the instructions over a telephone line using a modem. A modem local to the computer system 400 may receive the data on the telephone line and use an infrared transmitter to convert the data to an infrared signal. An infrared detector coupled to the bus B can receive the data carried in the infrared signal and place the data on the bus B. The bus B carries the data to the memory unit 420, from which the CPU 401 retrieves and executes the instructions. The instructions received by the memory unit 420 may optionally be stored on mass storage 415 either before or after execution by the CPU 401.

The computer system 400 also includes a communication interface 405 coupled to the bus B. The communication interface 405 provides a two-way data communication coupling to a network that is connected to, for example, a local area network (LAN), or to another communications network such as the Internet. For example, the communication interface 405 may be a network interface card to attach to any packet switched LAN. As another example, the communication interface 405 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 405 sends and receives electrical, electromagnetic, or optical signals that carry digital data streams representing various types of information.

The network 300 typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, CAT 6 cable, coaxial cable, optical fiber, etc). The signals through the various networks and the signals on the network and through the communication interface 405, which carry the digital data to and from the computer system 400 may be implemented in baseband signals, or carrier wave based signals. The baseband signals convey the digital data as un-modulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as un-modulated baseband data through a "wired" communication channel and/or sent within a predetermined frequency band, different than baseband, by modulating a carrier wave. The computer system 400 can transmit and receive data, including program code, through the network and the communication interface 405. Moreover, the network may provide a connection to a mobile device such as a personal digital assistant (PDA) laptop computer, or cellular telephone.

Alternatively, the centralized utility server 320 may also implemented in a MFP. An exemplary hardware configuration of an MFP will be discussed below.

Figure 5:
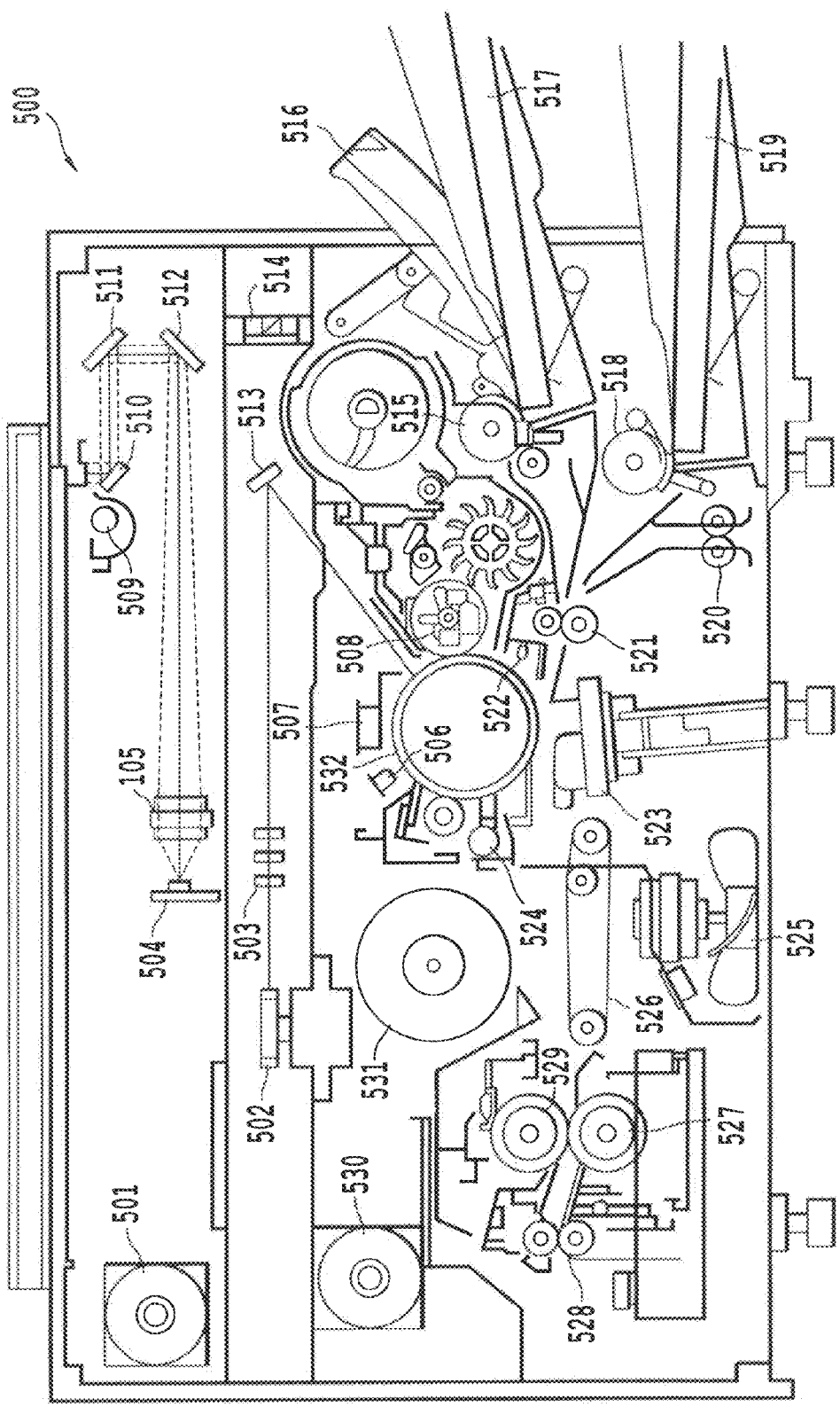
FIG. 5 illustrates hardware components of an exemplary MFP.

FIG. 5 illustrates an exemplary mechanical layout of an MFP 500. In FIG. 5, 501 is a fan for the scanner, 502 is a polygon mirror used with a laser printer, and 503 designates an F theta lens used to collimate light from a laser. Reference number 504 designates a sensor for detecting light from the scanner, 505 is a lens for focusing light from the scanner onto the sensor 504 and 506 is a quenching lamp used to erase images on the photoconductive drum 532. There is a charging corona unit 507 and a developer roller 508. Reference numeral 509 designates a lamp used to illustrate a document to be scanned and 510, 511, and 512 designate mirrors used to reflect light onto the sensor 504. There is a drum mirror 513 used to reflect light to the photoconductive drum 532 originating from the polygon mirror 502. Reference numeral 514 designates a fan used to cool the charging area of the MFP, and 515 is a first paper feed roller used for feeding paper from the first paper cassette 517, and 516 is a manual feed table. Similarly, element 518 is a second paper feed roller for the second cassette 519. Reference numeral 520 designates a relay roller, 521 is a registration roller, 522 is an image density sensor, and 523 is a transfer/separation corona unit. Reference numeral 524 is a cleaning unit, 525 is a vacuum fan, element 526 is a transport belt, 527 is a pressure roller, and 528 is an exit roller. Reference numeral 529 is a hot roller used to fix toner onto the paper, 530 is an exhaust fan, and 531 is the main motor used to drive the digital copier/printer multi-function machine.

Figure 6:
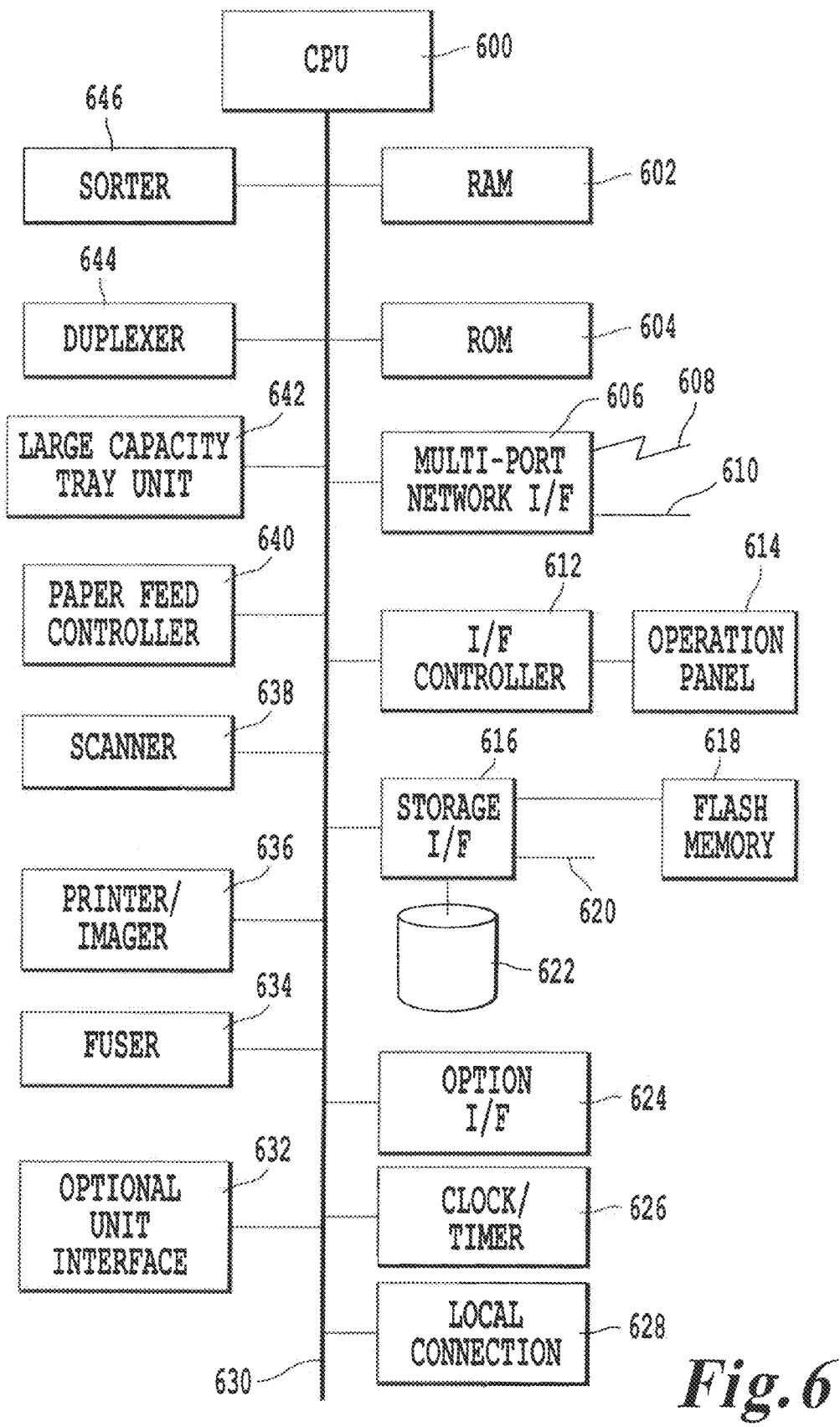
FIG. 6 illustrates electronic components of the MFP illustrated in FIG. 5.

FIG. 6 illustrates a block diagram of the electronic components of the MFP 500 illustrated in FIG. 5. The CPU 600 is a microprocessor and acts as the system controller. There is a random access memory (RAM) 602 to store dynamically changing information including operating parameters of the digital copiers. A read-only memory (ROM) 604 stores the program code used to run the MFP 500 and also information describing the static-state data such as model number, serial number, and default parameters that would not change over the life of the machine. When the device needs to boot up from either a hard disk or flash memory, the ROM memory 604 stores the boot sequence.

Similar to the computer system 400 discussed above, the MFP 500 may perform a portion or all processing steps in response to the CPU 600 executing one or more sequences of one or more instructions contained in a memory, such as the ROM 604 or of one of the memory types discussed above with respect to the computer system 400. The instructions may be read into the memory from another computer-readable medium, as discussed above, such as mass storage or removable media. One or more processors in a multi-processing arrangement may also be employed to execute the sequences of instructions contained in the memory. In alternative embodiments, hard-wired circuitry may be used in place of or in combination with software instructions. Thus, embodiments are not limited to any specific combination of hardware circuitry and software.

There is provided a multi-port communication interface 606, which allows the MFP 500 to communicate with external devices. Reference numeral 608 represents a telephone or other communication line including a wireless channel. An interface controller 612 is used to connect an operation panel 614 to a system bus 630. The operation panel 614 includes standard input and output devices found on a digital copier/ printer multi-function machine or business office appliance including some function buttons such as reduce/enlarge and numeric buttons, etc. Additionally, a liquid crystal display may be included within the operation panel 614 to display parameters and messages of the apparatus. The operation panel also can be a touch panel in which the display and function buttons may change according to the context.

A local connection interface 628 is a connection through local port such as RS232, USB and IEEE 1394. This interface 628 allows external devices to be attached to the apparatus.

A storage interface 616 connects storage devices to the system bus 630. The storage devices include a flash memory 618 and a disk 622. There is a connection 620 connected to the storage interface 616 which allows for additional memory devices to be connected. The flash memory 618 is used to store semi-static data which describes parameters of the device which infrequently change over the life of the apparatus, including the option configuration, network access parameters, and work group, and also can be used to store dynamic data that describes parameters dynamically changing such as print count. An option interface 624 allows additional option devices to be attached and controlled. A clock/timer 626 is utilized to keep track of both the time and date and also to measure elapsed time.

On the left side of FIG. 6, the various sections making up the image formation functions of the MFP 500 are illustrated. Reference numeral 646 designates a sorter and contains sensors and actuators used to sort the output of the digital copier/printer multi-function machine. There is a duplexer 644 that allows a duplex operation to be performed and includes conventional sensors and actuators. The MFP 500 includes a large capacity tray unit 642 that allows paper trays holding a large number of sheets to be used. The large capacity tray unit 642 includes conventional sensors and actuators.

A paper feed controller 640 is used to control the operation of feeding paper into and through the MFP 500. A scanner 638 is used to scan images into the MFP 500 and includes a control system of conventional scanning elements such as a light, mirror, etc. Additionally, scanner sensors are used, such as a home position sensor, to determine that the scanner is in the home position, and a lamp thermistor is used to ensure proper operation of the scanning lamp. There is a printer/imager 636, which prints the output of the MFP 500 and includes a conventional laser printing mechanism, a toner sensor, and an image density sensor. The fuser 634 is used to fuse the toner onto the page using a high temperature roller and includes an exit sensor, a thermistor to assure that the fuser 634 is not over heating, and an oil sensor. Additionally, there is an optional unit interface 632 used to connect optional units such as an automatic document feeder, a different type of sorter/collator, or other elements that can be added to the MFP 500.

First Embodiment

Figure 7:
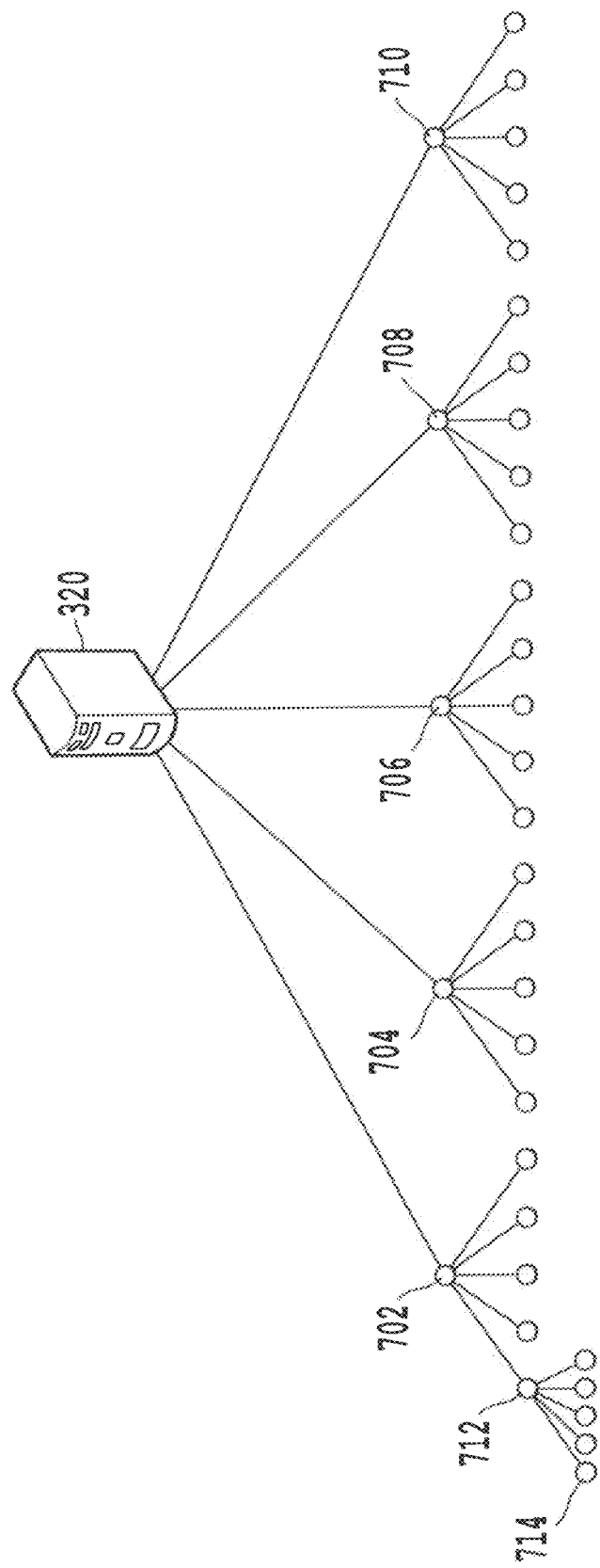
FIG. 7 is a flow chart illustrating a list-based peer-to-peer distribution model according to an exemplary embodiment of the present invention.

FIG. 7 illustrates a peer-to peer mechanism for distributed updates across a fleet of MFPs 355 in an enterprise printing environment. This exemplary description assumes that all MFPs behave properly (no failures). Of course one skilled in the art will understand that while the invention is described in this context, the present invention is may operate in an environment that does include failures and in fact make provision for such eventualities.

Furthermore, while this disclosure presents the various nodes in the system as MFPs, these nodes could be any type of nodes that are configured to receive software updates. For example, the peer-to-peer distribution method may be employed in a wireless communication system in which the update of nodes starts with a Radio Network Controller, for example, and propagates all the way down to the level of a mobile communications device. Similarly, the peer-to-peer distribution method may be employed in any network environment that includes a plurality of computing devices, such as that disclosed in FIG. 4, which are configured to communicate with one another. These computing devices (e.g., nodes) may be servers, user PCs, or any similar computing device utilizing software configured to accept an update procedure. In essence, this disclosure is not limited to an enterprise computing system including only MFPs, but may also be applied to any network of devices that include nodes, which use software capable of being updated.

The tree structure depicted in FIG. 7 may represent a corporate organization chart or a tree-shaped chain of command in general. This description will use the terms superior, self and subordinate to represent the parent, self and child respectively of any node. More specifically:

self: Any given node.
superior: Node that delegates update to other nodes
subordinate: Node that receives delegation from other node.

Thus, all nodes have one superior and T subordinates with the following exceptions:

root: Has T subordinates but no superior.
leaf: Has one superior but no subordinates.

Similarly, all nodes serve as both superior and subordinate, except the root and leaf. The nodes will be MFPs with the exception of the remote installer, which may be either the centralized utility server 320, or an MFP incorporating the functionality of the centralized utility server. The root is generally the first node in the network to which the payload, discussed below, is distributed from the remote installer. However, the root may also be the remote installer (e.g. centralized utility server 320), as discussed below with reference to FIG. 5 in the third embodiment of the invention.

The fundamental mechanism for the peer-to-peer distribution is shown in FIG. 7. The remote installer delegates the update job from server 320 to T number of MFPs 702-710, each of these T MFPs 702-710 in turn delegate the update to T MFPs at a subordinate level 712 and so on to succeeding subordinate levels 714. When an update job is complete, reports of results will similarly propagate in the opposite direction. In other words, update reports will propagate from the MFPs to the remote installer (e.g., centralized utility server 720 or MFP incorporating the functionality of the centralized utility server).

Figure 8:
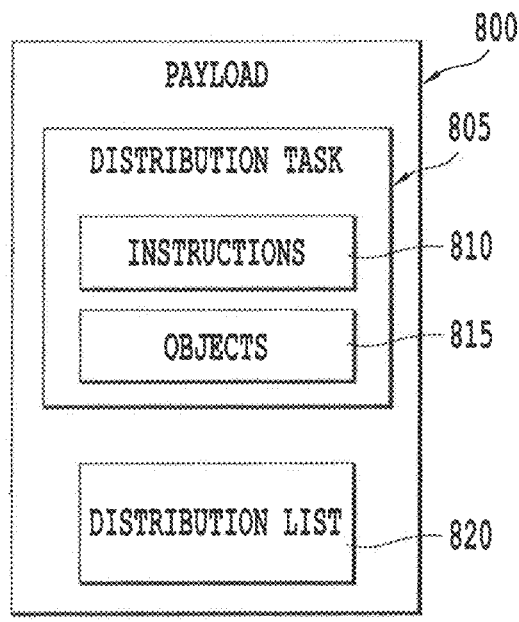
FIG. 8 illustrates an exemplary payload according to an exemplary embodiment of the present invention.

An exemplary configuration of the payload 800 distributed from the remote installer to the MFPs is illustrated in FIG. 8. The payload 800 is comprised of two major parts: the distribution task 805 and the distribution list 820. The distribution task 805 holds the instructions 810 and optional object(s) 815 that will be used to implement the task on the node that receives the payload. The distribution list 820 defines nodes that will receive the payload after the node holding a given payload implements the distribution task 805. It should be noted that the distribution task 805 remains unchanged (is copied identically) as it is distributed from peer-to-peer whereas the distribution list 820 is modified to update the subsequent subordinate nodes that are to receive the payload 800, as discussed below.

In accordance with the present invention, MFPs may be sent only the upgrade file and job metadata as an object 815, instead of a full reinstallation packaged with the upgrade file. This small payload allows MFP agents to send the job concurrently to multiple subordinate MFPs.

It should also be noted that each of the MFPs in the fleet include a peer-to-peer agent, which is specifically configured to handle the processing of the payload in order to complete the distribution task and update the distribution list 820, as discussed below. The peer-to-peer agent may be implemented utilizing a simple servlet application acting as the peer-to-peer agent on each MFP (one servlet which responds to three or four different types of requests). The servlet would typically receive requests using native servlet technology and send requests using the open-source Jakarta HTTP Client for example, as used by the remote installer. Of course, one skilled in the art would understand that this is an exemplary embodiment and other implementations are possible.

Figure 9:
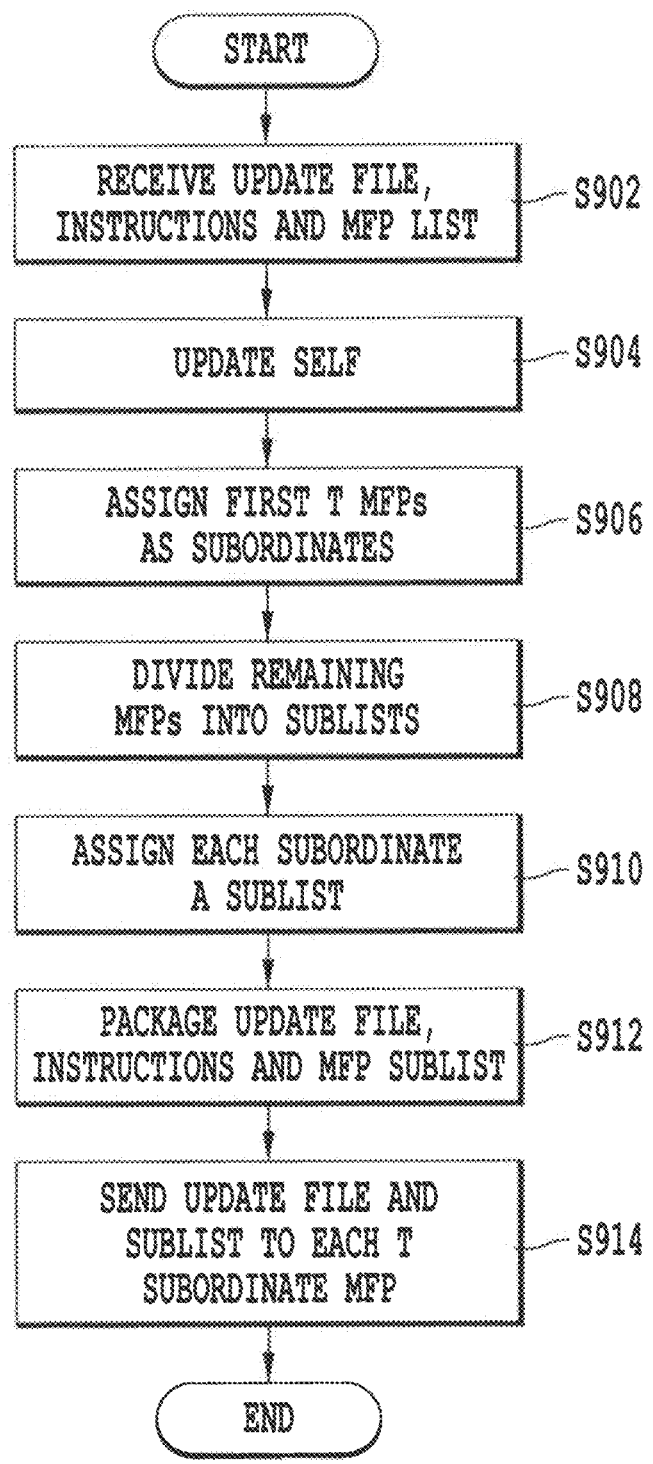
FIG. 9 is a flow chart illustrating a basic mechanism of peer-to-peer update model according to an exemplary embodiment of the present invention.

FIG. 9 is a flowchart of the update process, which will described focusing on the branch occupied by node 702 of FIG. 7. The node 702 MFP receives two files in step S902: one is the update file (e.g. distribution task 805, which may include a configuration file or certificate, and/or update instructions metadata); the other is a list of target subordinate MFPs (distribution list 820) that will be sent this configuration file, certificate, update instructions or metadata after installation at the node 702 MFP. Upon receiving the files (S902), the node 702 MFP first performs the task indicated by the distribution task and performs a self update using the received configuration file, certificate, update instructions or metadata (S904). After performing the self update, the node 702 MFP then delegates to the other MFPs as follows: node 702 takes the first T number of MFPs of level 712 on the target list and assigns them as its subordinates (S906). Node 702 subdivides the remaining MFPs on its target list into even subsets of level 714 nodes (S908) assigned to each subordinate 712 (S910), and packages (S912) the payload 800, including the updated distribution list 820 and the instructions 810 and objects 815, to be transmitted to each level 712 node. The Node A then sends (S914) each of its subordinates at level 712 its respective target list and a copy of the update file in the form of the payload 800 shown in FIG. 8.

Upon receiving the target list and copy of the update file, each subordinate in level 712 in turn repeats the steps followed by node 702 shown and described in FIG. 9 and thus now acts as a superior itself. In other words, each receiving target then propagates the update in the same manner as shown and described for node 702 to successive levels, for example 714 and beyond as needed.

The overall effect of steps S906-S914 in FIG. 9 of selecting subordinates, subdivide remaining targets among subordinates and sending to subordinates is the growth of the tree, or identifying targets for updating. The overall effect of step S404 is the completion of updates throughout the tree.

It should be noted that that the distribution list 820 received by each MFP becomes smaller and smaller as the process repeats from one generation or level to the next. Eventually, MFPs receive empty lists and thus have no subordinates to which to pass files. The MFPs without subordinates represent leafs in the tree and will update themselves but not pass the update job to others.

Figure 10:
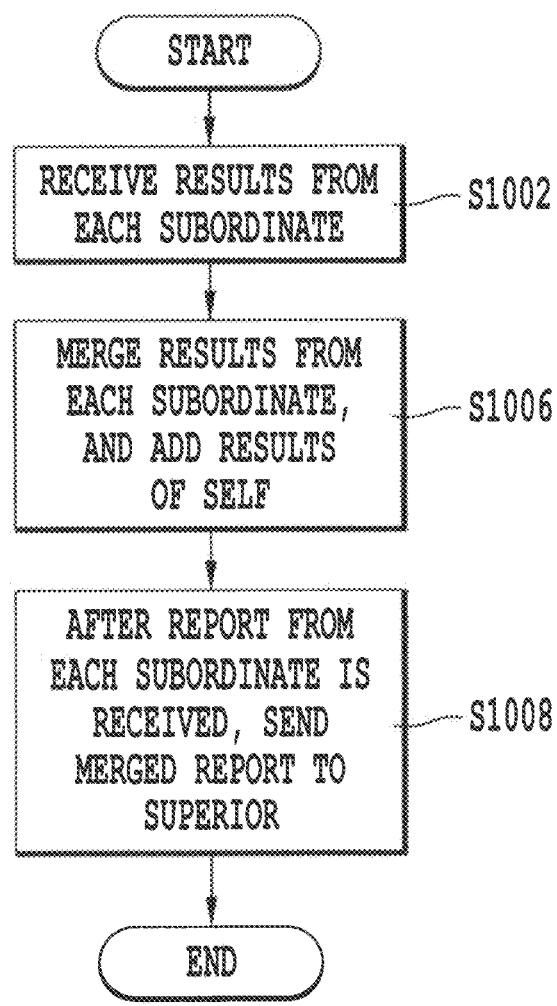
FIG. 10 is a flow chart illustrating a result reporting process according to an exemplary embodiment of the present invention.

Turning now to FIG. 10, there is shown and described the results management process. The results management process is the opposite of the update process described with respect to FIG. 10 with respect to the flow of information. In the reverse direction, each leaf MFP reports its result to its superior, and each superior reports the result of itself and its subordinates to its own superior and so on back to the remote installer. The remote installer, therefore, will receive the result statuses of all MFPs on the original target list. The reverse path of reporting may not follow the same path as the update process, however, the targets of each subordinate would be the superior node that transmitted the update and target information. In that way, the report process will follow in reverse from the last node or leaf to the initiator of the update process. As shown and described in FIG. 10, a superior node receives, from a subordinate node, the results of the subordinate node's self update with the merged results of any nodes subordinate to the subordinate node (S1002). Each superior node, after a report from each subordinate is received, merges its own report results data with the report results data received (S1006) from the subordinate nodes and the in turn sends the merged report to its superior node (S1008).

It can be noted that report data may include information such as MFP status, and/or update success.

Figure 11:
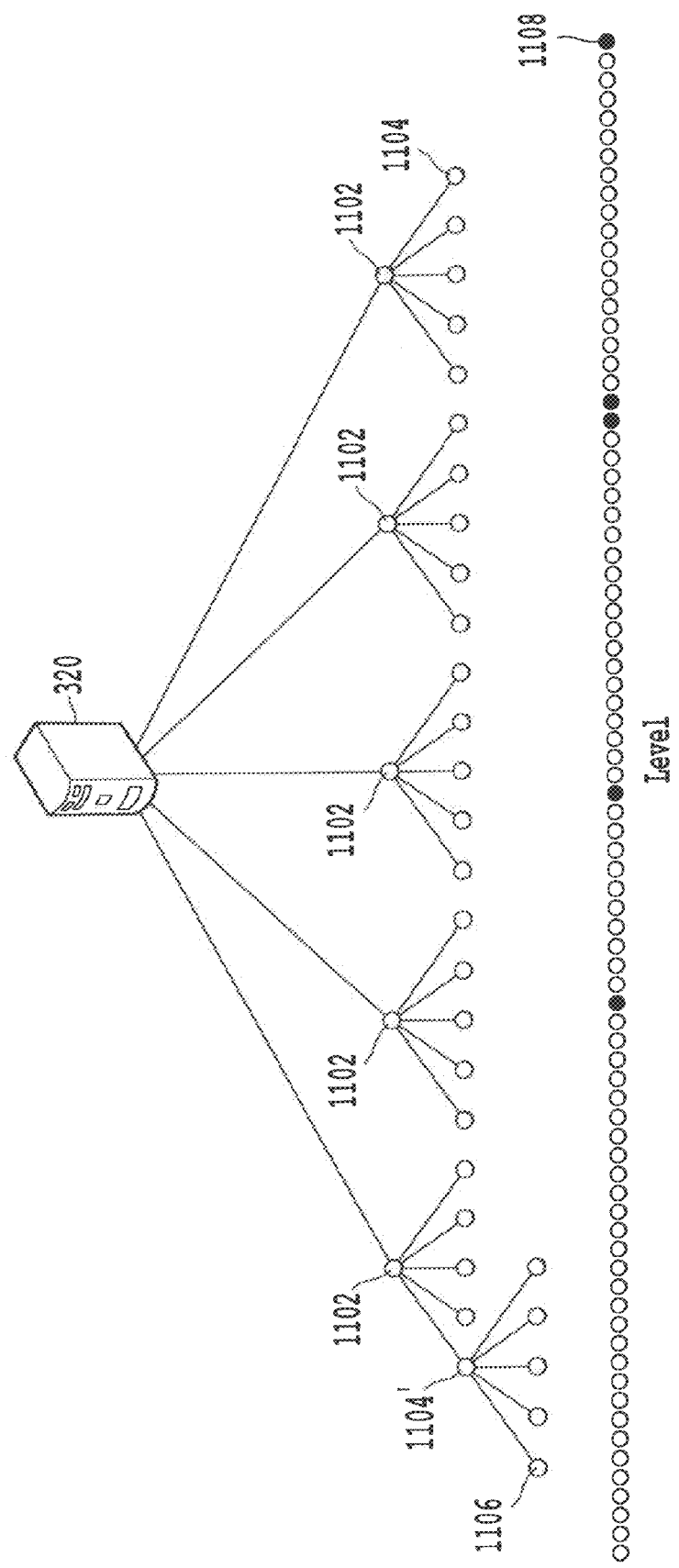
FIG. 11 is a flow chart illustrating a failover mechanism for unavailable subordinates at a leaf level in accordance with an exemplary embodiment of the present invention.

Turning now to FIG. 11 there is shown a diagram of an exemplary failover process according to the present invention. The entire update process may be viewed as updates propagating from the root to leafs and result statuses traveling in the opposite direction. This flow will be interrupted by any node that is unavailable to distribute the update or pass the report. Nodes will be unavailable in this role when they are powered down or do not have the software agent installed.

In the event that there are unavailable nodes, a failover process is implemented to allow the update or reports to flow past them. Various methods may be employed in the failover process. For example, as explained above, superiors select subordinates from the target list they receive, and then assign these subordinates subsets of the target list for them to repeat the process. If a subordinate is unavailable, all target MFPs on its assigned list will not receive updates. The process described in relation to FIG. 11 overcomes this problem in the following way.

FIG. 11 shows a diagram wherein the centralized utility server 320 is depicted as connected to a plurality of subordinate nodes 1102. In the first step of the failover process, when assigning a subordinate, the superior 320 first tests its availability by sending a request to determine if the subordinate 1102 is available. If unavailable, the subordinate node 1102 is skipped over as a subordinate and is placed at the bottom of the target list 1108. After available subordinates are found, the "subdivide list" and "send to subordinates" steps described in relation to FIG. 9 are performed. For example as depicted in FIG. 9, a list of subdivided subordinates 1104 is composed from nodes 1102 and likewise a list of subdivided subordinates 1106 is composed from node 1104'. The end result of the failover process described here results in a tree structure where all unavailable MFPs are pushed to the leaf level 1108. These nodes, therefore, fail only in updating themselves and not in a role as superior node.

When leafs are unavailable, a failover mechanism is implemented such that when a superior is notified that its subordinate is unavailable via the mechanism described above, the superior will report the subordinate with failed update status and will not wait for the subordinate to report.

Figure 12:
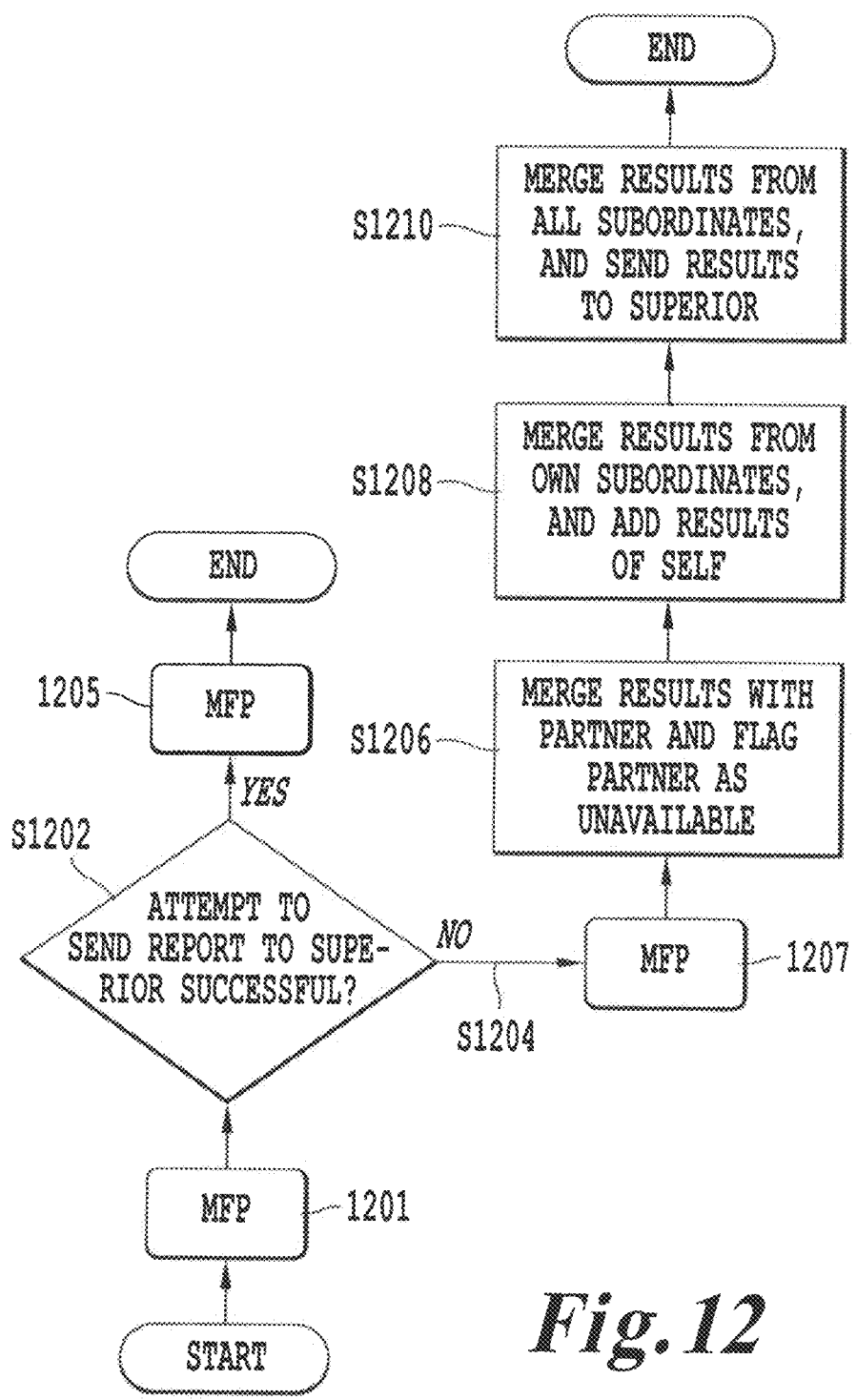
FIG. 12 is a flow chart illustrating a failover mechanism for results management in accordance with an exemplary embodiment of the present invention.

Turning now to FIG. 12 a flowchart depicts the failover process for results management propagation when there is an unavailable superior. Since unavailable nodes (MFPs) are pushed to the leaf level, it is unlikely that a superior node will be unavailable to pass results towards the root. However, in the unlikely event of such an occurrence, the following failover mechanism is implemented for this condition.

In step S1202 subordinate node 1201 attempts to send report to superior node 1205, and the superior node 1205 fails to respond. The subordinate node 1201 then sends a report (S1204) to first available partner 1207 of the unresponding superior. In S1208, the partner 1207 of the unresponding superior 1205 merges reports of its own subordinates 1203 and itself with reports of the failed partner's subordinate 1201. In S1206, when the report is sent to next level MFP 1209, the failed partner 1205 is flagged as unavailable so that next-level superior does not wait for a report from failed partner 1205. It should be noted that the order in which steps S1206 and S1208 are performed may be switched without affecting the outcome of the process. In step S1210, the merged results from all subordinates and of the partner 1207 are sent to the superior node of the partner 1207.

In this process, a node's "partner" refers to any node that is in the same level in the tree as the node in question (e.g., in this case the failed node).

Figure 13:
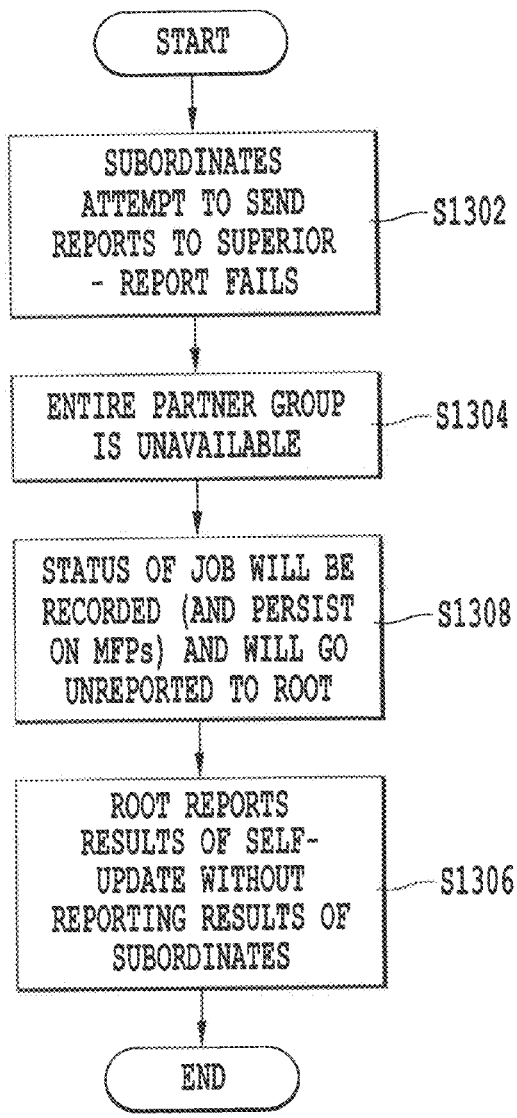
FIG. 13 is a flow chart illustrating a failover mechanism when entire partner group is unavailable in accordance with an exemplary embodiment of the present invention.

FIG. 13 shows a flowchart for results propagation when there is an unavailable partner group. This circumstance is an even rarer case when not just a superior has failed but all T MFPs in the superior's partner group have failed. In this case, the failed superior cannot be sidestepped using the mechanism described above with reference to FIG. 12. Therefore, the following failover mechanism is implemented when a superior and its entire partner group are unavailable.

In S1302, a subordinate attempts to send a report to its superior. In the case of this example at S1304, the attempt fails due to the entire partner group being unavailable. Therefore, in this circumstance, at S1308, the superior cannot receive reports from subordinates, this the condition "send results to its superior when all of its subordinates report" can never be met. Thus, at step S1306, a secondary rule is implemented whereby if a superior does not receive a report from subordinates within a predetermined length of time of sending an update job the superior will send a result report with self result only. When the remote installer receives report from all subordinates (after applying same rule if need be) the unreported MFPs will hold the initial failed status. Thereafter the job will be retried by the remote installer.

The centralized utility server 320 will merge reports from its subordinates as done by all nodes acting as superiors. If all MFPs on the original target list report success statuses, the job ends and persists as a completed job record on the remote installer. If however, one or more MFPs have failed statuses (either because they were unavailable or failed in job of receiving and copying update file to self), the job is retried once as follows. The remote installer reconstructs target list with failed MFPs only. The remote installer then selects available subordinates from pool of successful MFPs, the update Job is sent as described above and results are sent back in accordance with the procedure described above. An update job is completed after this retry. However, failed MFPs persist in the job record for review and updating at a later time.

Second Embodiment

As discussed above, the peer-to-peer distribution relies on the capabilities of the peer-to-peer software agent included in each of the MFPs in the fleet to complete the distribution task 805 and update the distribution list 820, as necessary. More particularly, the distribution mechanism requires that the peer-to-peer software agent resides and runs on each node in the network. Therefore, an embodiment in which the software agent is distributed together with the payload 800 to be installed at each of the nodes in the network will be discussed below.

This configuration is similar to the peer-to-peer distribution process discussed above, but involves using a traditional one-to-one distribution process to first distribute the peer-to-peer software agent to a node lacking its presence, using its own peer-to-peer distribution mechanism. Once the peer-to-peer agent is installed on the node, then the payload is transmitted to the node, and the peer-to-peer update process proceeds as described in the first embodiment.

The present embodiment is directed to a method for the peer-to-peer agent to co-opt the one-to-one mechanism into its peer-to-peer mechanism in order to distribute itself in the same way that any distribution task is distributed in the peer-to-peer distribution process as described above. The result is that the initial distribution of the peer-to-peer agent into a population of nodes lacking its presence follows the same distribution process as described in above. Consequently, this initial distribution of the agent enjoys the same gains in workflow and time as described above, and is more efficient than a traditional one-to-one peer distribution of the software agent.

The payload in this embodiment is substantially similar to that described above with reference to FIG. 8. However, one of the objects 815 included in the payload is the peer-to-peer software agent for installation to each of the nodes to which the payload is distributed. Moreover, the instructions 810 provided in the payload 800 instruct each node to distribute the peer-to-peer agent to each subordinate node in a one to one manner before sending the payload 800 including the software updates to the subordinate node.

Figure 14:
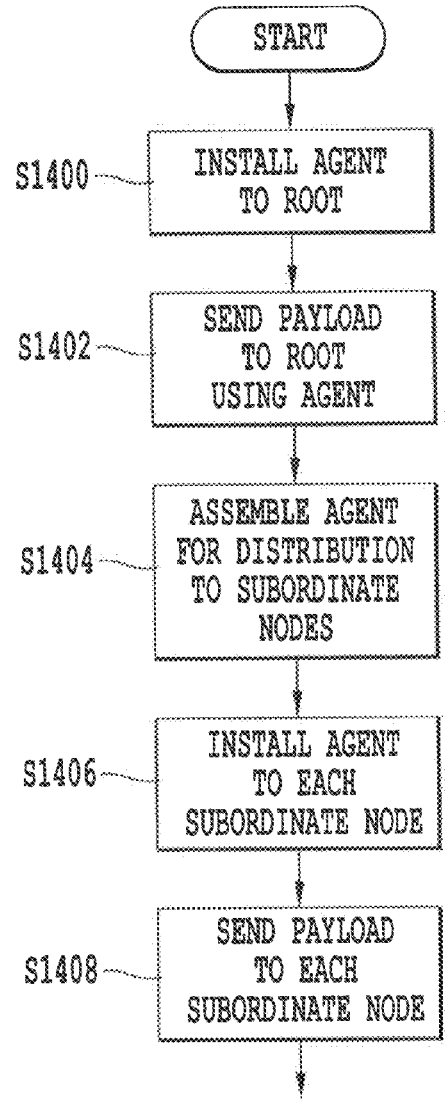
FIG. 14 is a flow chart illustrating a process for peer-to-peer installation of the peer-to-peer agent according to an exemplary embodiment of the present invention.

An exemplary process of performing the peer-to-peer agent software distribution is shown in FIG. 14. At S1400, the peer-to-peer agent is installed from the centralized utility server 320 to the root peer-to-peer distribution node (e.g., nodes 702, 704, 706, etc. shown in FIG. 7). Then, at S1402, the centralized utility server 320 provides the payload 800 to the root. The payload provided to the root includes a distribution task 805 to install the peer-to-peer agents to each of the nodes subordinate to the root node, and one of the objects 815 in the payload includes the actual peer-to-peer agent to be installed in each of the subordinate nodes.

Once the peer-to-peer agent is installed at the root, the root assembles the peer-to-peer agent (S1404) for subsequent one-to-one distribution and installation to each of its direct subordinate nodes (S1406). After the peer-to-peer agent is installed in each of the subordinate nodes, the root node sends the payload including the update mechanism to each of the subordinate nodes (S1408). In other words, once the peer-to-peer agent is installed at each of the subordinate nodes, the payload including the software updates are distributed in a manner similar to the process shown in FIG. 9.

Thus, the general update process is similar to the process shown in FIG. 9. However, prior to sending the payload including the update file to each of the subordinate nodes, a higher level node first installs the peer-to-peer agent to each of the subordinate nodes. As noted above, the payload transmitted from each higher level node includes a distribution task 805 to install the peer-to-peer software agent to each of the nodes subordinates, and the peer-to-peer agent itself as an object 815. Otherwise, the payload is substantially similar to that described with reference to FIG. 8.

Using such a configuration, the software update files can be transmitted to each of the nodes in the fleet in the manner disclosed in FIG. 9, by installing the peer-to-peer agent to facilitate the peer-to-peer distribution.

Third Embodiment

In another embodiment of the present invention, the centralized utility server 320, is configured to provide specialized functionality when it participates as the root of the peer-to-peer distribution system.

In this configuration, the server is capable of performing various specialized functions as the root node by interacting with each of the MFPs in the fleet. Examples of these specialized functions include, but are not limited to, reading configurations of software plug-ins installed at each of the MFPs, reading operating system attributes (e.g. available memory, version) of each MFP, reading application attributes (e.g. installation status, version) of each MFP, and determining which embedded applications are installed in each MFP.

As noted above, a user may interact with the software management module 335 of the centralized utility server 320 to preprocess distribution tasks. This preprocessing may include selecting distribution task(s), uploading software binaries for distribution, setting plugin configurations for distribution, etc. The preprocessing may also include setting a list of MFPs in the fleet that will be targeted for distribution. As noted above with reference to FIG. 3, the software management module 335 also interacts with the components in the vendor server 305 to retrieve the software updates, and interacts with at least the software package module 325 and licensing module 330 to prepare the payload 800 for distribution. The software updates may be retrieved from the vendor server as a result of a request for the software updates, or based on an automatic push of a message from the vendor server 305 indicating that software updates are available. The software package module 325 then packages the payload 800 including the above noted information for subsequent distribution to the target MFPs.

Figure 16:
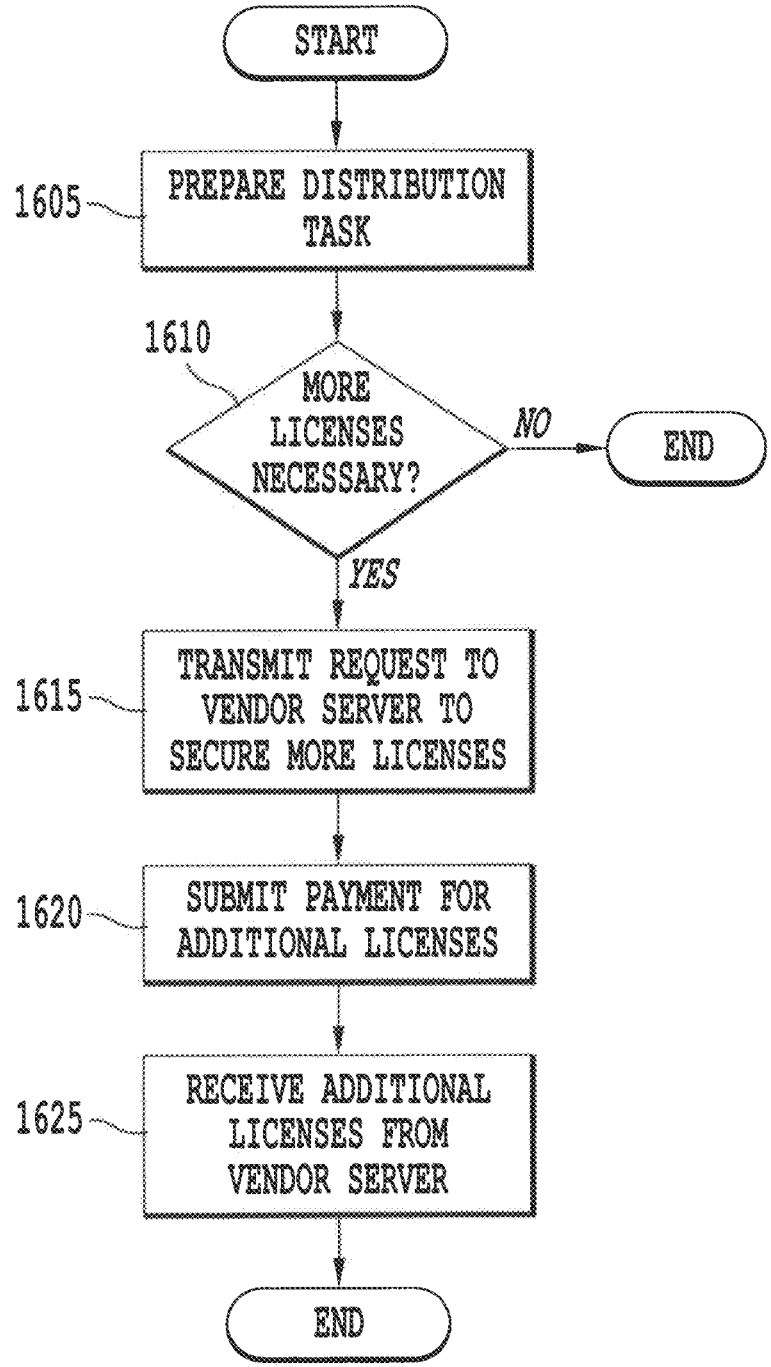
FIG. 16 describes a process of securing additional licenses for the software updates from a vendor server.

FIG. 16, for example, shows a process in which the licensing module 330 of the centralized utility server 320 automatically requests additional software licenses from the vendor server after determining that the purchase of additional licenses is necessary due to the size of a distribution task. At S1605, the software management module 335 preprocesses a requested distribution task and compares (S1610) the number of software licenses necessary for the distribution against a number of available software licenses available at the centralized utility server. When it is determined that more licenses are necessary for the distribution, the licensing module 330 of the centralized utility server transmits a request for the additional licenses to the vendor server (S1615). It should be noted that when the licensing module 330 determines that additional licenses are necessary, a display may be provided on the display of the centralized utility server 320 alerting a user that additional licenses are necessary, or the licensing module may forego this step and automatically transmit the request for additional licenses to the vendor server 305. Otherwise stated, the request for additional licenses may be generated automatically, or generated on the basis of an input from a user at the centralized utility server 320. Once it is determined that the additional licenses should be requested the centralized utility server 320 submits a payment to the vendor server 305 for the additional licenses (S1620), and the additional licenses are provided from the vendor server 305 (S1625).

The software management module 335 is also capable of saving a preprocessing state as template to use or modify in future. These templates are saved in a template library in a memory of the centralized utility server 320, and a user may view the available templates, attach descriptions to each of the templates, and apply a selected template to new distribution.

The centralized utility server 320 also includes the peer-to-peer manager 340, which pushes the payload to its subordinate nodes. These subordinate nodes then employ the process described in relation to FIG. 9 using their respective peer-to-peer agents to distribute the payload to each of their subordinate nodes.

The peer-to-peer manager 340 in this embodiment allows user to verify preprocessing and then initiate distribution to target MFPs, participates as first (root) node in the peer-to-peer distribution process disclosed above, calculates expected time for distribution to be completed among target MFPs, and tracks the progress of the distribution results (time duration, number of MFPs that fail or succeed, reasons for failure) as it propagates down the distribution tree.

The peer-to-peer manager 340 also manages the results of the update process, since the results of the update at each MFP are reported directly to the centralized utility server 320. This process differs from the reporting process disclosed with reference to FIG. 10, for example, in which each subordinate node reports its results to the subordinate node from which the payload including the update was received. Such a configuration allows for an user at the centralized utility server 320 to review results of completed distribution (e.g. MFPs that failed to install update and reasons for failure), and also to review results of past distributions.

As noted above, the present embodiment, in which the centralized utility server 320 acts as the root node in the update process, allows the root to perform memory and CPU intensive preprocessing and distribution result tracking activities. This configuration is in contrast to the configuration noted above with respect to FIGS. 7 and 9 in which the root may be any node type, including small devices (e.g. cell phone, networked appliance, etc.) to which data is pushed from the remote installer. As noted above, the remote installer may be the centralized utility server 320 or an MFP incorporating functions similar to those implemented in the centralized utility server 320.

Further, as discussed above, each MFP node reports the results of its implementation of the distribution task directly to the peer-to-peer manager 340 at the centralized utility server 320 (e.g., the root). This allows an user to view real-time results (success/failures) of the distribution process as it progresses from root to leaf. This contrasts with the method disclosed above, in which the root waits for one report to arrive, as propagated and merged from leafs to root through intermediary tree levels.

Figure 15:
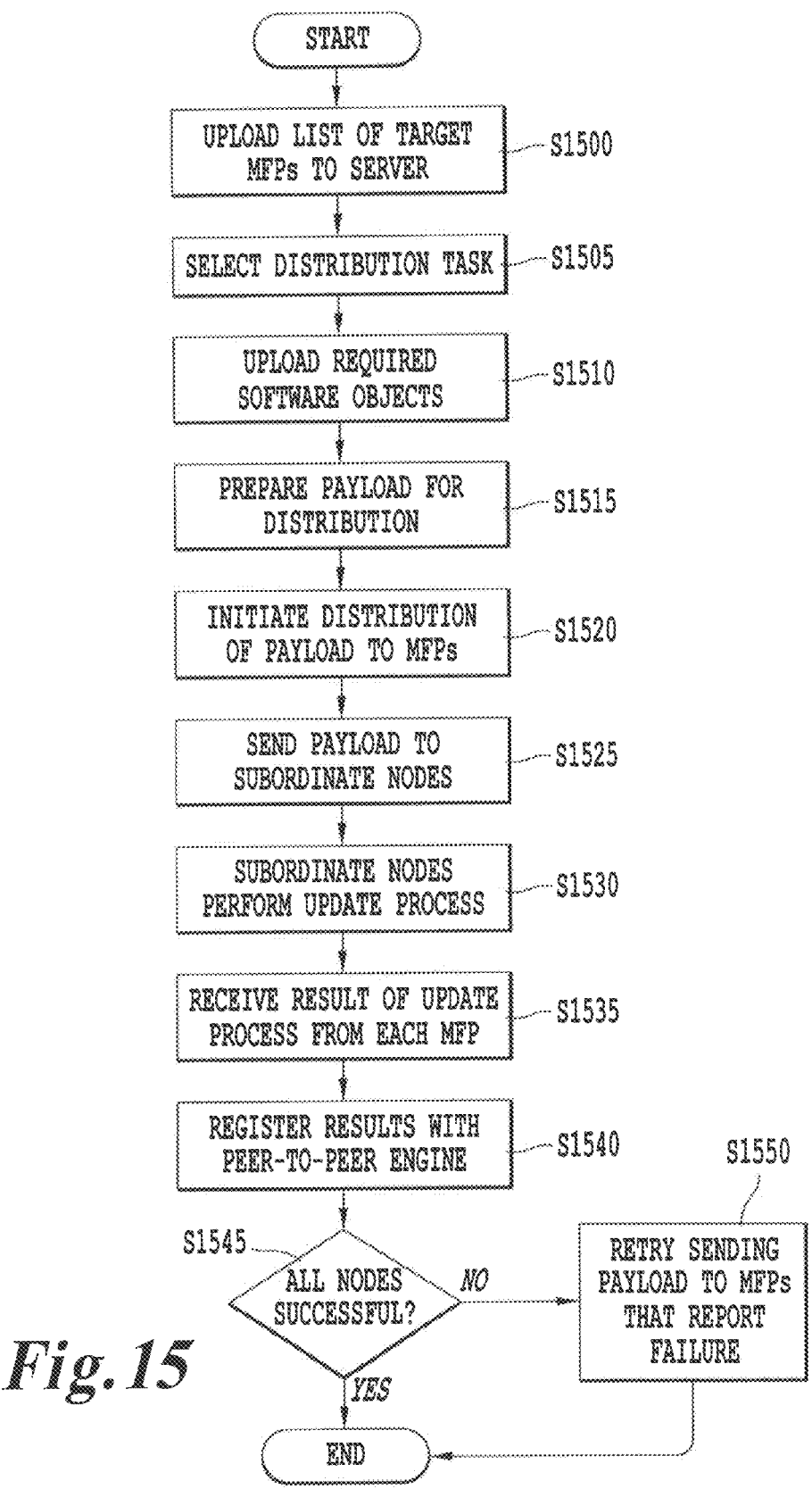
FIG. 15 is a flow chart illustrating a mechanism of peer-to-peer update model when the centralized utility server is implemented as the root according to an exemplary embodiment of the present invention.

FIG. 15 discloses an exemplary process of performing the peer-to-peer distribution using the centralized utility server 320 as the root node.

At S1500 a user uploads list of target MFPs to the software management module 335 of the centralized utility server. As noted above, each target MFP will implement distribution task via peer to peer mechanism, in accordance with the process disclosed in FIG. 9. At S1505 a user then selects a distribution task (e.g. update version of plugin) and (S1510) uploads the required software objects (e.g. plugin binaries used in update) for distribution. This step also includes identifying the MFPs that are to be the target of the distribution task. As noted above, the update version may be acquired from the vendor server 305 by the licensing module 330 at the centralized utility server 320. At S1515, the software package module 325 and peer-to-peer manager 340 prepare the payload 800 for distribution. The steps taken to prepare the payload for distribution may include providing instructions specific to distribution task (e.g., reboot after installation), properly packaging the objects, and creating the distribution list. At S1520 the peer-to-peer manager initiates distribution of the payload to each of its subordinate MFPs, and at S1525 sends the payload to each of its subordinates, thereby launching the peer-to-peer distribution process among the nodes subordinate to the root. Then at S1530, each MFP performs the update process by disseminating the payload using the process described with reference to FIG. 9.

As noted above, the result reporting process of this configuration differs from the reporting process disclosed in FIG.

10 in that each MFP reports the result of the update process directly to the centralized utility server 320 (S1535) functioning as the root node. The result report sent from each MFP indicates an identification of the MFP, a result of the update process (e.g., success, failure, etc.), as well as any additional information pertinent to the result of the update procedure.

In the embodiment disclosed with reference to FIG. 10, leaf nodes initiate a report that propagates back to the root, across tree levels. Nodes at each level merge results of the branch below it then send report to next level until the root is reached. In such a configuration, the root is unaware of any results until reports arrive from nodes on the tree level directly below it, as these reports hold the results of entire branches of MFPs. In the present configuration, however, in which the centralized utility server 320 is implemented as the root, from the roots perspective, the reports flow to the root as a continuous input of results from single MFPs as the tree levels are progressed during the peer-to-peer update mechanism.

At S1540 the results of the update process are registered with the peer-to-peer manager 340 at the centralized utility server 320. At S1545, the peer-to-peer manager 340 and the software management module 335 determine whether all of the targeted MFPs were successful in installing the software update. If one or a plurality of the MFPs reported a failure, the peer-to-peer manager 340 may automatically retry the software update process by transmitting the payload to specific MFPs that were unsuccessful in installing the software update (S1550). At this point, an user may also view the results using the software management module 335, and configure the peer-to-peer manager 340 to transmit the payload only to specific targeted MFPs that reported unsuccessful results.

It should also be noted that when the centralized utility server 320 is implemented as the root, that the invention is also capable of pushing the peer-to-peer agent to each of the MFPs in the network. The centralized utility server 320 may act as the root node and distribute the peer-to-peer agent in the one-to-one peer-to-peer scheme as disclosed with reference to FIG. 14, or may directly install the peer-to-peer software agent to each of the MFPs in the system, which do not already include the peer-to-peer agent.

When the centralized utility server 320 is implemented as the root node, additional capabilities are also available to the user by virtue of the software management module 335 in the server.

For example, while a distribution process is in progress, a user may select to view a current progress of the results of the update process. The software management module 335 contacts the peer-to-peer manager 340 to collect current results and presents these results to the user. The parameters associated with the results may indicate a step in the update sequence, time elapsed step in sequence, the number of MFPs that have been successfully updated, and/or the number of MFPs that have reported a failure.

Moreover, after a distribution process is complete, at any time, the user may review results persisting on server. In this configuration, the software management module 335 obtains such information from the peer-to-peer manager 340 for presentation to the user. Results from each distribution that has been launched are stored and are viewable separately, identified by distribution task (e.g. update configuration of plugin "X") and timestamp (date:time).

Numerous modifications and variations of the present invention are possible in light of the above teachings. It is therefore to be understood that within the scope of the appended claims, the invention may be practiced otherwise than as specifically described herein.

The invention claimed is:

1. A method for peer-to peer distributed client updates comprising:
   uploading, to a server, a list of target network accessible devices as devices that are to receive an update file;
   generating, at a processor of said server, a first sublist of the target network accessible devices;
   sending, from a network interface of said server, the update file and the first sublist of the target network accessible devices to a superior node of the target network accessible devices included in the list of target network accessible devices;
   pushing, from a network interface of the superior node, the update file and a second sublist of the target network accessible devices that is different from the first sublist of target network accessible devices and is generated at the superior node to each of the target network accessible devices included in the first sublist; and
   transmitting, from each of said target network accessible devices, a reporting result indicating a result of a software update.

2. The method of claim 1, further comprising:
   registering, at said server, the report results received from each of said target network accessible devices.

3. The method of claim 2, wherein the report results indicate at least one of said target network accessible devices that was unsuccessful in performing a software update based on the update file.

4. The method of claim 3, further comprising:
   identifying said at least one of said target network accessible devices that was unsuccessful in performing a software update; and
   transmitting the update file directly from the server to said at least one of said target network accessible devices that was unsuccessful in performing the software update.

5. The method of claim 1, further comprising:
   displaying, at the server, real-time results of a peer-to-peer update process by displaying a list of target network accessible devices that have reported performing a successful software update.

6. The method of claim 1, further comprising:
   displaying, at the server, real-time results of a peer-to-peer update process by displaying a time lapsed since a peer-to-peer update process was initialized.

7. The method of claim 1, further comprising:
   storing the list of target network accessible devices and parameters related to a distribution of the update file transmitted to the target network accessible devices as a distribution template.

8. A server configured to distribute software updates to a plurality of network connected devices, comprising:
   a user interface configured to receive an input selecting a list of target network accessible devices as devices that are to receive an update file;
   a processor, at the server, configured to generate a first sublist of the target network accessible devices;
   a network interface configured to transmit the update file and the first sublist of the target network accessible devices to a superior node of said target network accessible devices included in the list of target network accessible devices, which then generates a second sublist of the target network accessible devices that is different from the first sublist of target network accessible devices and pushes the update file and the second sublist of network accessible devices to each of the target network accessible devices identified in said first sublist as subordinates; and the network interface configured to receive, from each target network accessible device, a reporting result indicating a result of a software update.

9. The server of claim 8, further comprising:
a module configured to register the report results received from each of said target network accessible devices.

10. The server of claim 9, wherein the report results indicate at least one of said target network accessible devices that was unsuccessful in performing a software update based on the update file.

11. The server of claim 10, further comprising:
a module configured to identify said at least one of said target network accessible devices that was unsuccessful in performing a software update; and
the network interface configured to transmit the update file directly to said at least one of said target network accessible devices that was unsuccessful in performing the software update.

12. The server of claim 8, wherein the user interface is configured to display real-time results of a peer-to-peer update process by displaying a list of target network accessible devices that have reported performing a successful software update.

13. The server of claim 8, wherein the user interface is configured to display real-time results of a peer-to-peer update process by displaying a time lapsed since a peer-to-peer update process was initialized.

14. The server of claim 8, further comprising:
a memory configured to store the list of target network accessible devices and parameters related to a distribution of the update file transmitted to the target network accessible devices as a distribution template.

15. A server configured to distribute software updates to a plurality of network connected devices, comprising:
means for receiving an input selecting a list of target network accessible devices as devices that are to receive an update file;
means for generating a first sublist of the target network accessible devices;
means for transmitting the update file and the first sublist of the target network accessible devices to a superior node of said target network accessible devices included in the first sublist, which then generates a second sublist of the target network accessible devices that is different from the first sublist of target network accessible devices and pushes the update file and the second sublist of network accessible devices to each of the target network accessible devices identified in said first sublist as subordinates; and
means for receiving, from each target network accessible device, a reporting result indicating a result of a software update.

16. The server of claim 15, further comprising:
means for registering the report results received from each of said target network accessible devices.

17. The server of claim 16, wherein the report results indicate at least one of said target network accessible devices that was unsuccessful in performing a software update based on the update file.

18. The server of claim 17, further comprising:
means for identifying said at least one of said target network accessible devices that was unsuccessful in performing a software update; and
means for transmitting the update file directly to said at least one of said target network accessible devices that was unsuccessful in performing the software update.

19. The server of claim 15, further comprising:
means for storing the list of target network accessible devices and parameters related to a distribution of the update file transmitted to the target network accessible devices as a distribution template.

* * * * *